United States Patent [19]
Johnson

[11] 4,411,564
[45] Oct. 25, 1983

[54] INDEXABLE CUTTING INSERT HAVING RADIUSED CUTTING EDGES

[75] Inventor: William B. Johnson, Rockford, Ill.

[73] Assignee: The Ingersoll Milling Machine Company, Rockford, Ill.

[21] Appl. No.: 312,772

[22] Filed: Oct. 19, 1981

[51] Int. Cl.³ .................. B23B 39/00; B23B 47/00; B23P 15/34; B23D 1/12

[52] U.S. Cl. ........................... 407/113; 408/113

[58] Field of Search .................. 407/34, 36, 39, 40, 407/41, 42, 47, 48, 113, 114

[56] References Cited

U.S. PATENT DOCUMENTS

| | | | |
|---|---|---|---|
| 3,751,782 | 8/1973 | Fruish | 407/114 |
| 3,818,562 | 6/1974 | Lacey | 407/113 |
| 4,182,587 | 1/1980 | Striegl | 407/113 |
| 4,188,162 | 2/1980 | Zweekly | 407/114 |
| 4,278,369 | 7/1981 | Jakobs et al. | 407/113 |
| 4,294,565 | 10/1981 | Erkfritz | 407/114 |

*Primary Examiner*—E. R. Kazenske
*Assistant Examiner*—Paul M. Heyrana, Sr.
*Attorney, Agent, or Firm*—Leydig, Voit, Osann, Mayer & Holt, Ltd.

[57] ABSTRACT

An on-edge indexable cutting insert in which each end of the insert is formed with a convexly curved surface which gradually decreases in area per unit of length as the curved surface proceeds away from the cutting edges so as to form each cutting edge with a convexly curved tip of relatively large radius while leaving a flat and planar locating surface of substantial area on each end of the insert.

6 Claims, 13 Drawing Figures

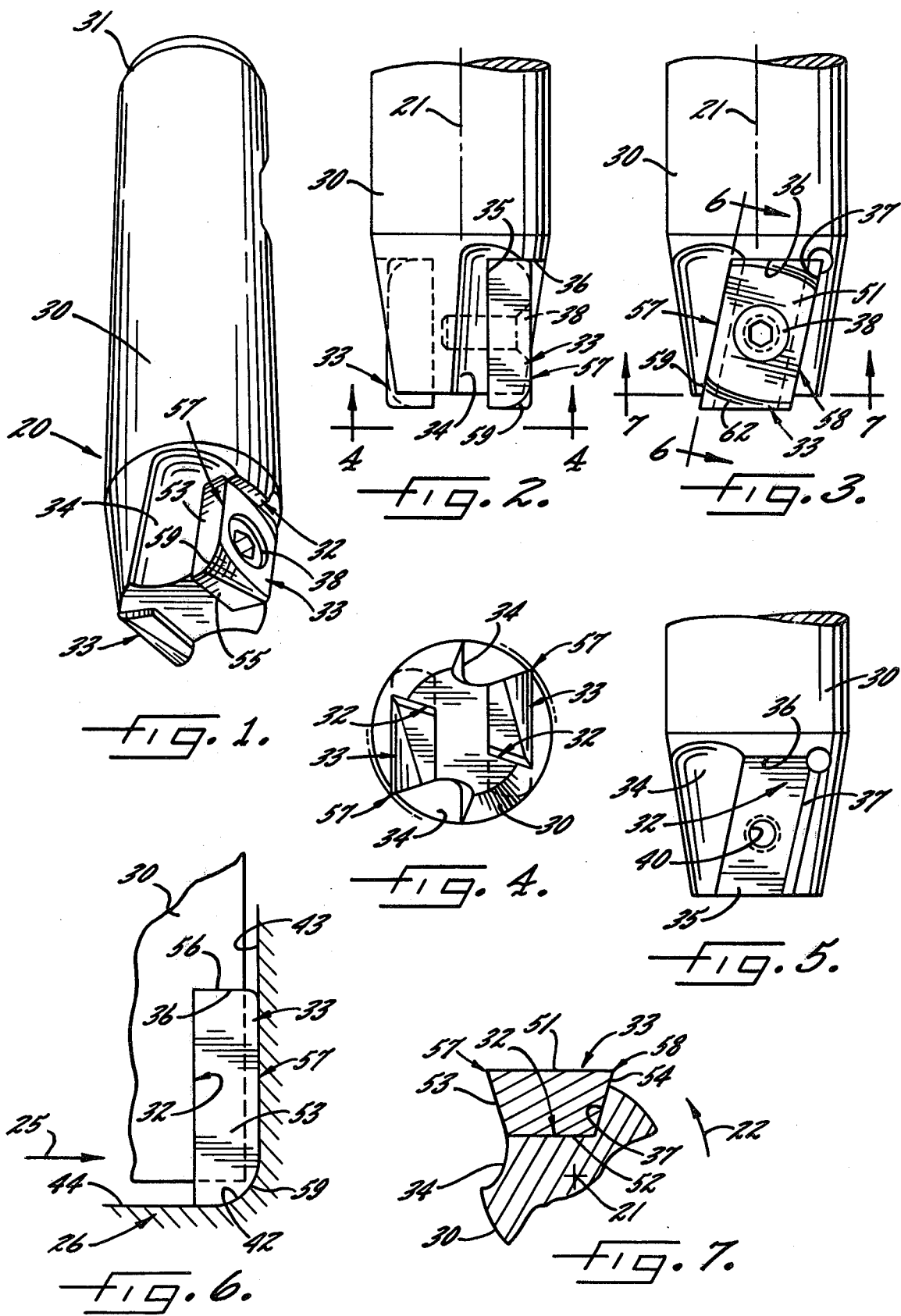

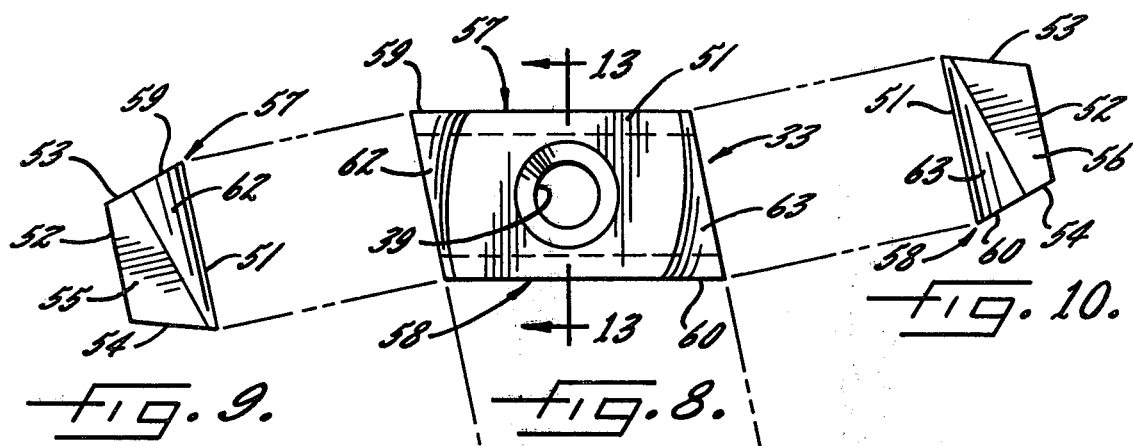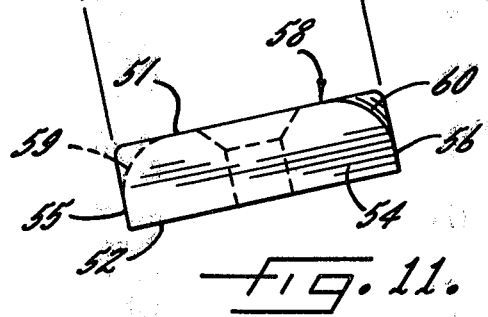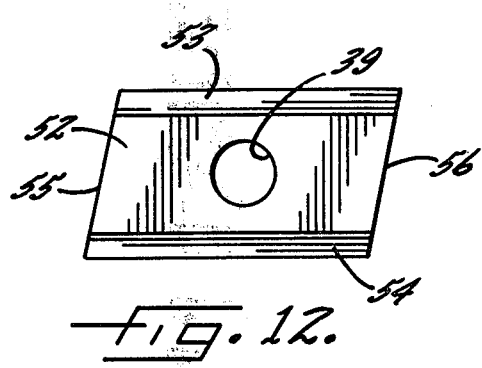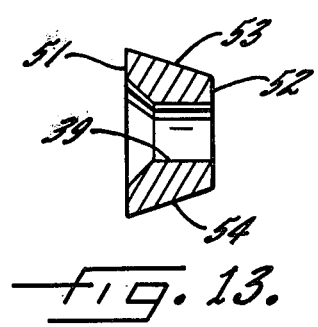

4,411,564

INDEXABLE CUTTING INSERT HAVING RADIUSED CUTTING EDGES

BACKGROUND OF THE INVENTION

This invention relates to a cutting insert of the "on-edge" type and having selectively usable cutting edges each adapted to be brought into active cutting position when the insert is indexed. The advantages of an "on-edge" indexable insert of the same general type as the present insert are discussed in detail in Striegl U.S. Pat. No. 4,182,587.

The insert of the present invention is especially useful as the front insert of an end milling cutter. When so used, the insert is disposed within a pocket in the forward end portion of the cutter body and seats against a locator at the rear of the pocket.

In some cases, it is necessary that the front insert of an end mill make a radiused cut in the workpiece rather than a right-angled or sharp-cornered cut. In order to effect a radiused cut, it is necessary to form the insert such that the tip of its cutting edge is convexly curved. Difficulty has been encountered, however, in providing a comparatively thin insert, and particularly a comparatively thin, on-edge insert, having multiple cutting tips each curved on a relatively large radius. If each cutting tip of such an insert is radiused by conventional techniques, the curvature of the inactive rear end of the insert prevents the insert from seating intimately against the locator at the rear of the insert pocket. As a result, thin inserts having cutting tips curved on a relatively large radius generally have been designed in the past with only a single cutting tip and with a flat and planar non-cutting rear end capable of seating against the locator.

SUMMARY OF THE INVENTION

The general aim of the present invention is to provide a new and improved indexable insert, preferably of the on-edge type, having multiple cutting tips each convexly curved on a radius which is large in comparison to the thickness of the insert and having a flat and planar locating surface of substantial area on each end of the insert.

A further object of the invention is to provide an indexable insert having cutting edges with radiused cutting tips which are uniquely formed such that the curvature imparted to the tip of one cutting edge does not significantly shorten the effective length of the other cutting edge.

Still another object is to provide an insert having a radiused cutting tip which is stronger than the radiused tips of prior inserts of the same general type.

In brief, the invention resides in forming each end of the insert with a convexly curved surface which uniquely decreases in area per unit of length as the curved surface proceeds away from the cutting edge.

These and other objects and advantages of the invention will become more apparent from the following detailed description when taken in conjunction with the accompanying drawings.

BRIEF DESCRIPTION OF THE DRAWINGS

FIG. 1 is a perspective view of a typical end milling cutter having new and improved inserts incorporating the unique features of the present invention.

FIG. 2 is a fragmentary side elevational view of the cutter shown in FIG. 1.

FIG. 3 is a fragmentary plan view of the cutter shown in FIG. 1.

FIG. 4 is an end view of the cutter as taken along the line 4—4 of FIG. 2.

FIG. 5 is a fragmentary plan view similar to FIG. 3 but shows the cutter with one of the inserts removed.

FIGS. 6 and 7 are enlarged fragmentary cross-sections taken substantially along the lines 6—6 and 7—7, respectively, of FIG. 3.

FIG. 8 is a top plan view of the insert.

FIGS. 9 and 10 are end views of the insert as projected along the lines extending from FIG. 8.

FIG. 11 is a side view of the insert as projected along the lines extending from FIG. 8.

FIG. 12 is a bottom plan view of the insert.

FIG. 13 is a cross-section taken substantially along the line 13—13 of FIG. 8.

DETAILED DESCRIPTION OF THE PREFERRED EMBODIMENTS

While some of the principles of the invention are applicable to various types of cutters, reference is herein made to an end milling cutter 20 rotatable about a central axis 21 in the direction of the arrow 22 (FIG. 7). The cutter is adapted to be fed radially in the direction of the arrow 25 so as to remove metal from a workpiece 26.

More specifically, the cutter 20 includes a cylindrical metal body 30 having a mounting shank 31 at its inner end and formed with two angularly spaced pockets 32. Each pocket opens out of the outer end of the body and out of the peripheral surface thereof and is adapted to receive a cutting insert 33. A chip recess 34 (FIGS. 1, 4 and 7) is formed in the body adjacent the leading side of each pocket 32.

Each pocket 32 comprises a platform 35 (FIG. 5) upon which the insert 33 rests and further comprises two substantially flat and planar locating abutments 36 and 37 disposed adjacent the inner and trailing sides, respectively, of the pocket. A screw 38 (FIG. 3) extends through a centrally located hole 39 (FIG. 8) in each insert 33 and is threaded into a tapped hole 40 (FIG. 5) in the platform 35. The screw clamps the insert against the platform and crowds the insert into tight engagement with the abutments 36 and 37.

In certain milling operations, it is necessary that a radiused corner 42 (FIG. 6) of relatively large concave curvature be formed at the junction of the milled surfaces 43 and 44 of the workpiece 26. According to the present invention, the inner and outer ends of the insert 33 are uniquely formed so as to enable each end of a relatively thin insert to be formed with a convex curvature having a relatively large effective cutting radius but, at the same time, to be left sufficiently flat and planar as to be capable of seating in intimate face-to-face engagement with the inner locating abutment 36 of the pocket 32.

More particularly, each insert 33 is formed from a block of tungsten carbide or other suitable cutting material and is defined by first and second substantially flat and planar face surfaces 51 and 52 (FIGS. 8 to 12) disposed in parallel planes, the face surface 51 being adapted to lie against the platform 35 of the pocket 32. The insert is shown in detail in FIGS. 8 to 12 and, for purposes of convenience, the first and second face surfaces 51 and 52 will be referred to as upper and lower face surfaces, respectively. The hole 39 extends between the face surfaces 51 and 52 and is located with its axis extending perpendicular to the face surfaces. At its upper end, the hole is countersunk so as to enable the head of the screw 38 to lie slightly below the upper face surface 51.

The lower face surface 52 of the insert 33 is quadrilateral in shape (see FIG. 12) and, in this particular instance, is shaped as a rhomboid. The upper face surface 51 is substantially in the shape of a rhomboid. Thus, each face surface includes two oppositely disposed long sides and two oppositely disposed short sides.

Extending between opposite long sides of the face surfaces 51 and 52 are two oppositely facing edge surfaces 53 and 54 (FIG. 9) which define cutting faces. The two long edge surfaces 53 and 54 are flat and planar and are inclined such that the included angle between each edge surface and the upper face surface 51 is acute (e.g., 70 degrees).

When the long edge surface 53 is in active cutting position as shown in FIG. 6, the long edge surface 54 seats face-to-face against the trailing abutment 37 of the pocket 32 and coacts with the trailing abutment to resist the tangential cutting forces which are imposed on the insert 33 when the cutter 20 is rotated and fed radially. When the insert is indexed 180 degrees about the axis of the hole 39, the edge surface 54 is brought into active cutting position while the edge surface 53 is positioned against the trailing abutment 37.

Two shorter edge surfaces 55 and 56 extend between the long edge surfaces 53 and 54 at the outer and inner ends of the insert 33. The short edge surface 55 is inclined at an acute included angle (e.g., 80 degrees) relative to the long edge surface 53 while the short edge surface 56 is inclined at the same acute included angle relative to the long edge surface 54. Both of the short edge surfaces 55 and 56 lie in planes which are substantially perpendicular to the planes of the face surfaces 51 and 52.

A first cutting edge 57 (FIG. 8) is defined along the intersection of the long edge surface 53 with the upper face surface 51 and along the intersection of the long edge surface 53 with the short edge surface 55. Another cutting edge 58 is defined along the intersection of the long edge surface 54 with the upper face surface 51 and along the intersection of the long edge surface 54 with the short edge surface 56. When one cutting edge becomes worn, the insert may be indexed 180 degrees about the axis of the hole 39 to bring the other cutting edge into active cutting position.

In carrying out the invention, the tips 59 and 60 of the cutting edges 57 and 58 are each convexly curved on a relatively large radius while leaving substantial areas of the short edge surfaces 55 and 56 in a flat and planar state. For this purpose, the junction between the upper face surface 51 and the short edge surface 55 is defined by a convexly curved surface 62 (FIG. 9) which gradually decreases in area per unit of length as the curved surface proceeds from the long edge surface 53 to the long edge surface 54 (see FIGS. 8 and 9). By the same token, the junction between the upper face surface 51 and the short edge surface 56 is defined by a similar convexly curved surface 63 which gradually decreases in area per unit of length as the curved surface proceeds from the long edge surface 54 to the long edge surface 53 (see FIGS. 8 and 10). Thus, each curved surface 62, 63 defines a radius which is relatively large at the cutting tip itself. Each curved surface, however, nearly vanishes at the opposite side of the insert. As a result, each short edge surface 55, 56 is shaped substantially as a flat and planar trapezoid whose height increases as the short edge surface progresses away from the respective cutting tip 59, 60 (see FIGS. 9 and 10). Accordingly, each short edge surface defines a flat locating surface which may seat intimately against the inner abutment 36 of the pocket 32 in spite of the presence of the large radius at the tip of the cutting edge.

Prior to formation of the curved surfaces 62 and 63, the short edge surfaces 55 and 56 intersect the upper face surface 51 at substantially right angles such that sharp corners are present at the junctions between the short edge surfaces 55 and 56 and the face surface 51. The preferred manner of forming each curved surface 62 and 63 with a decreasing area per unit of length is by non-parallel cylindrical grinding of the junctions. In other words, each junction is ground such that each curved surface 62, 63 defines a section of a cylinder whose axis is non-parallel both with respect to the adjacent short edge surface and the face surface 51. With each curved surface 62, 63 coinciding with the surface of a "skewed" cylinder, each curved surface is of constant radius along its length but effectively decreases in area per unit length as it proceeds from the cutting tip. Taking the curved surface 62 as an example, the distance from the start of the curved surface 62 on the face surface 51 to the plane of the edge surface 55 is significantly greater along the long edge surface 53 than along the long edge surface 54. In addition, the distance from the start of the curved surface 62 on the short edge surface 55 to the plane of the face surface 51 is greater along the long edge surface 53 than along the long edge surface 54.

To form each curved surface 62, 63 as a section of a "skewed" cylinder, a grinding wheel may be positioned with its axis disposed in non-parallel relation to the face surface 51 and to the appropriate short edge surface 55, 56 so that the depth of cut of the wheel gradually becomes less as the cut proceeds across the end of the insert from the cutting tip 59, 60. This is in contrast to conventional radius grinding where the axis of the wheel is parallel to the surfaces 51 and 55, 56 and where a constant depth of cut is maintained.

As an alternative to forming each curved surface 62, 63 as a section of a "skewed" cylinder, each curve may be formed as a section of a cone which tapers upon progressing from the cutting tip 59, 60. In such an instance, both the radius and the area per unit length of the curved surface will decrease as the surface proceeds away from the cutting tip.

With curved surfaces 62 and 63 of the type described, the effective straight length of each cutting edge 57 and 58 is greater than is the case when the curves are formed by conventional radius grinding. In other words, because the curved surface 63, for example, virtually vanishes at the cutting edge 57, the effective straight length of the cutting edge 57 is not significantly reduced by the curved surface 63. Thus, a greater depth of cut may be achieved from an insert formed from a carbide block having a given length prior to grinding. The longer cutting edge not only is advantageous in a cutter 20 of the type which has been shown but also in a cutter such as disclosed in Striegl U.S. Pat. No. 4,182,587 having multiple rows of axially spaced inserts. By virtue of the longer cutting edge, an insert with two radiused ends may effectively span the gap between two spaced inserts of an adjacent row. The strength of the cutting tips 59 and 60 also is increased by forming the curves 62 and 63 as described rather than by conventional radiusing techniques.

One specific example of an insert 33 has a thickness (i.e., the distance between the face surfaces 51 and 52) of about ⅛", a width (i.e., the distance between the long edge surface 53 and 54) of about ⅜" and a length (i.e., the distance between the short edge surface 55 and 56) of about ½". At the cutting tips 59 and 60, each curved surface 62 and 63 has a radius of just slightly less than ⅛" and is tangent to the face surface 51 and to the respective short edge surface 55 and 56. Thus, the radius of the cutting tip is almost as large as the thickness of the insert and yet the insert is left with a flat and planar locating surface of substantial area. Because the width of the insert is greater than its thickness and because of the orientation of the insert relative to the cutting body 30, the insert is of the "on-edge" type. That is, the cutting material of the insert is presented to the workpiece in such a manner that the compressive strength of the cutting material which opposes the tangential forces imposed on the insert is greater than the compressive strength which opposes the other forces exerted on the insert. Accordingly, an insert having a given volume of cutting material can be forced through the work with greater power without failing.

From the foregoing, it will be apparent that the present invention brings to the art a new and improved on-edge indexable insert 33 in which a comparatively large cutting tip radius is formed on each end of a relative thin insert while leaving the insert with flat and planar locating surfaces. The insert also possesses cutting edges which have a greater effective length and greater strength when compared with inserts which are radiused in a conventional manner.

I claim:

1. An indexable cutting insert comprising a block of cutting material having first and second oppositely facing and generally quadrilateral face surfaces, said block further including first and second oppositely facing edge surfaces extending between two opposite side margins of said face surfaces, said block having third and fourth oppositely facing and substantially flat and planar edge surfaces extending between the remaining two side margins of said face surfaces, there being a first cutting edge defined along the intersection of said first edge surface with said first face surface and with said third edge surface and there being a second cutting edge defined along the intersection of said second edge surface with said first face surface and with said fourth edge surface, the junction between said first face surface and said third edge surface being defined by a convexly curved surface which decreases in area per unit of length as said curved surface progresses from said first edge surface toward said second edge surface, and the junction between said first face surface and said fourth edge surface being defined by a convexly curved surface which decreases in area per unit of length as the latter curved surface progresses from said second edge surface toward said first edge surface, whereby each of said cutting edges is formed with a convexly curved portion of relatively large radius while each of said third and fourth edge surfaces defines a substantially flat and planar locating face disposed adjacent said second face surface.

2. An indexable cutting insert as defined in claim 1 in which each of said curved surfaces coincides with the external surface of a section of a cylinder having an axis which is disposed in nonparallel relationship with said first face surface and with the adjacent one of said third and fourth edge surfaces.

3. An indexable cutting insert as defined in claim 1 in which each of said curved surfaces coincides with the external surface of a section of a cone.

4. An indexable cutting insert comprising a block of cutting material having first and second substantially flat and planar face surfaces disposed in parallel planes, a hole formed through said block and extending between said face surfaces, said block further including first and second substantially flat and planar edge surfaces located on opposite sides of said hole, said edge surfaces extending between said face surfaces and defining cutting faces, said block having third and fourth substantially flat and planar edge surfaces located on opposite sides of said hole and extending between said first and second edge surfaces, there being a first cutting edge defined along the intersection of said first edge surface with said first face surface and with said third edge surface and there being a second cutting edge defined along the intersection of said second edge surface with said first face surface and with said fourth edge surface, the junction between said first face surface and said third edge surface being defined by a convexly curved surface which decreases in area per unit of length as said curved surface progresses from said first edge surface toward said second edge surface, and the junction between said first face surface and said fourth edge surface being defined by a convexly curved surface which decreases in area per unit of length as the latter curved surface progresses from said second edge surface toward said first edge surface, whereby each of said cutting edges is formed with a convexly curved portion of relatively large radius while each of said third and fourth edge surfaces defines a substantially flat and planar locating face disposed adjacent said second face surface.

5. An indexable cutting insert comprising a block of cutting material having first and second substantially flat and planar face surfaces disposed in parallel planes, a hole formed through said block and extending between said face surfaces, said block further including first and second substantially flat and planar edge surfaces located on opposite sides of said hole and defining cutting faces, said edge surfaces extending between said face surfaces with the included angle between each of said edge surfaces and said first face surface being acute, said block having third and fourth substantially flat and planar edge surfaces located on opposite sides of said hole and extending between said first and second edge surfaces, the included angle between said first and third edge surfaces being acute and being equal to the included angle between said second and fourth edge surfaces, there being a first cutting edge defined along the intersection of said first edge surface with said first face surface and with said third edge surface and there being a second cutting edge defined along the intersection of said second edge surface with said first face surface and with said fourth edge surface, the junction between said first face surface and said third edge surface being defined by a convexly curved surface which decreases in area per unit of length as said curved surface progresses from said first edge surface toward said second edge surface, and the junction between said first face surface and said fourth edge surface being defined by a convexly curved surface which decreases in area per unit of length as the latter curved surface progresses from said second edge surface toward said first edge surface, whereby each of said cutting edges is formed with a convexly curved portion of relatively large radius while each of said third and fourth edge surfaces defines a substantially flat and planar locating face disposed adjacent said second face surface.

6. An indexable cutting insert as defined in claim 5 in which the locating face which is defined by said third edge surface increases in width as said third edge surface progresses from said first edge surface toward said second edge surface, the locating face which is defined by said fourth edge surface increasing in width as said fourth edge surface progresses from said second edge surface toward said first edge surface.

* * * * *